United States Patent
Nakazawa

(10) Patent No.: US 11,170,234 B2
(45) Date of Patent: Nov. 9, 2021

(54) VEHICLE DISPLAY CONTROL DEVICE, VEHICLE DISPLAY SYSTEM, VEHICLE DISPLAY CONTROL METHOD, NON-TRANSITORY STORAGE MEDIUM

(71) Applicant: JVCKENWOOD Corporation, Yokohama (JP)

(72) Inventor: Noriyuki Nakazawa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/851,159

(22) Filed: Apr. 17, 2020

(65) Prior Publication Data

US 2020/0242374 A1  Jul. 30, 2020

Related U.S. Application Data

(63) Continuation of application No. PCT/JP2019/002429, filed on Jan. 25, 2019.

(30) Foreign Application Priority Data

Apr. 2, 2018 (JP) .............................. JP2018-071004

(51) Int. Cl.
*G06K 9/00* (2006.01)
*B60K 35/00* (2006.01)
(Continued)

(52) U.S. Cl.
CPC .......... *G06K 9/00805* (2013.01); *B60K 35/00* (2013.01); *B60R 1/002* (2013.01);
(Continued)

(58) Field of Classification Search
CPC ...... B60K 2370/176; B60K 2370/1868; B60K 2370/21; B60K 2370/52; B60K 2370/797;
(Continued)

(56) References Cited

U.S. PATENT DOCUMENTS

2006/0274147 A1* 12/2006 Chinomi ............... G06T 3/4038
  348/118
2008/0129539 A1*  6/2008 Kumon .................... B60R 1/00
  340/901
(Continued)

FOREIGN PATENT DOCUMENTS

JP  2006-224700  8/2006
JP  2016-224700  8/2006
(Continued)

OTHER PUBLICATIONS

International Search Report and Written Opinion for International Patent Application No. PCT/JP2019/002429 dated Apr. 16, 2019, 11 pages.

*Primary Examiner* — Nathnael Aynalem
(74) *Attorney, Agent, or Firm* — Amin, Turocy & Watson, LLP

(57) ABSTRACT

A vehicle display control device includes a first image acquisition unit that acquires a first image by a first camera unit, a second image acquisition unit that acquires a second image by a second camera unit, a bird's-eye view image generation unit that generates a bird's-eye view image where a virtual vehicle image is synthesized at a center thereof based on the second image, a detection unit that performs an object recognition processing on the first image to detect a warning object, a direction calculation unit that calculates a direction of the warning object from the virtual vehicle image on a position of the warning object, and a display controller that displays the first image on a first monitor, and the bird's-eye view image and the direction of the warning object therein on a second monitor based on a position of the first camera unit in the vehicle image.

7 Claims, 11 Drawing Sheets

(51) Int. Cl.
  *B60R 1/00* (2006.01)
  *B60R 11/04* (2006.01)
  *B60W 50/14* (2020.01)
(52) U.S. Cl.
  CPC .............. *B60R 11/04* (2013.01); *B60W 50/14* (2013.01); *B60K 2370/171* (2019.05); *B60K 2370/178* (2019.05); *B60K 2370/179* (2019.05); *B60K 2370/31* (2019.05); *B60R 2300/105* (2013.01); *B60R 2300/607* (2013.01); *B60R 2300/8026* (2013.01); *B60R 2300/8066* (2013.01); *B60W 2050/146* (2013.01); *B60W 2554/4041* (2020.02); *B60W 2554/4044* (2020.02)
(58) Field of Classification Search
  CPC .............. B60K 35/00; B60K 2370/152; B60K 2370/171; B60K 2370/177; B60K 2370/179; B60K 2370/178; B60K 2370/31; B60K 2370/184; B60K 2370/182; B60R 1/00; B60R 11/04; B60R 2001/1215; B60R 2025/1013; B60R 2025/1016; B60R 2300/105; H04N 7/181; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; G01S 17/93; G01S 17/931; H04W 4/40
  USPC ......................................................... 348/148
  See application file for complete search history.

(56) References Cited

U.S. PATENT DOCUMENTS

| | | | |
|---|---|---|---|
| 2008/0231702 | A1* | 9/2008 | Matsumoto ............. G01S 15/86 348/148 |
| 2016/0042238 | A1* | 2/2016 | Lynam .................. B60W 10/20 701/45 |
| 2018/0265004 | A1* | 9/2018 | Kudou .................. G08G 1/167 |

FOREIGN PATENT DOCUMENTS

| | | |
|---|---|---|
| JP | 2013-003641 | 1/2013 |
| JP | 2015-182670 | 10/2015 |
| JP | 2017-162015 | 9/2017 |

\* cited by examiner (1)

VEHICLE DISPLAY CONTROL DEVICE, VEHICLE DISPLAY SYSTEM, VEHICLE DISPLAY CONTROL METHOD, NON-TRANSITORY STORAGE MEDIUM

CROSS-REFERENCE TO RELATED APPLICATIONS

This application is a Continuation of PCT International Application No. PCT/JP2019/002429 filed on Jan. 25, 2019 which claims the benefit of priority from Japanese Patent Application No. 2018-071004 filed on Apr. 2, 2018, the entire contents of which are incorporated herein by reference.

FIELD

The present application relates to a vehicle display control device, a vehicle display system, and a non-transitory storage medium.

BACKGROUND

A technique for detecting obstacles around a vehicle and warning a driver is known.

For example, Japanese Laid-open Patent Publication No 2013-3641 discloses a technique for displaying a warning in a direction in which an obstacle is detected in left and right side rear images and a rear image of a vehicle. For example, Japanese Laid-open Patent Publication No 2015-182670 discloses a technique for displaying an obstacle detected on a bird's-eye view image.

In backing a vehicle, when it is detected and warned that there is a pedestrian or another vehicle behind a vehicle, a driver often checks an electronic rear view monitor or an electronic side monitor firstly. However, when a warning object is not in a range displayed on an electronic rear view monitor or an electronic side monitor, a technique of Japanese Laid-open Patent Publication No 2013-3641 may cause confusion to a driver. Japanese Laid-open Patent Publication No 2015-182670 also discloses a technique for displaying an obstacle detected on a bird's-eye view image, but it is intended for obstacles in a range captured by a bird's-eye view image camera and not intended for obstacles that exist in a blind spot of an electronic rear view monitor or an electronic side monitor.

SUMMARY

A vehicle display control device, a vehicle display system, and a non-transitory storage medium are disclosed.

According to one aspect, there is provided a vehicle display control device comprising: a first image acquisition unit configured to acquire a first image captured by a first camera unit configured to capture a rear view, a rear left-side view, and a rear right-side view of a vehicle; a second image acquisition unit configured to acquire a second image captured by a second camera unit configured to capture images of surroundings of the vehicle; a bird's-eye view image generation unit configured to generate, based on the second image acquired by the second image acquisition unit, a bird's-eye view image in which a virtual vehicle image is synthesized at a center thereof; a detection unit configured to perform an object recognition processing on the first image acquired by the first image acquisition unit to detect a warning object; a direction calculation unit configured to calculate a direction of the warning object from the virtual vehicle image in the bird's-eye view image based on a position of the warning object detected by the detection unit in the first image; and a display controller configured to display the first image on a first monitor, and display the bird's-eye view image generated by the bird's-eye view image generation unit and the direction of the warning object calculated by the direction calculation unit in the bird's-eye view image on a second monitor based on a position of the first camera unit in the vehicle image as a reference position.

According to one aspect, there is provided a vehicle display control method comprising: acquiring a first image captured by a first camera unit configured to capture a rear view, a rear left-side view, and a rear right-side view of a vehicle; acquiring a second image captured by a second camera unit configured to capture images of surroundings of the vehicle; generating, based on the second image acquired by the second image acquisition unit, a bird's-eye view image in which a virtual vehicle image is synthesized at a center thereof; performing an object recognition processing on the first image acquired by the first image acquisition unit to detect a warning object; calculating a direction of the warning object from the virtual vehicle image in the bird's-eye view image based on a position of the warning object detected by the detection unit in the first image; and displaying the first image on a first monitor, and displaying the bird's-eye view image and the direction of the warning object in the bird's-eye view image on a second monitor based on a position of the first camera unit in the vehicle image as a reference position.

According to one aspect, there is provided a non-transitory storage medium that stores a program that causes a computer of a vehicle display control device to execute: acquiring a first image captured by a first camera unit configured to capture a rear view, a rear left-side view, and a rear right-side view of a vehicle; acquiring a second image captured by a second camera unit configured to capture images of surroundings of the vehicle; generating, based on the second image acquired by the second image acquisition unit, a bird's-eye view image in which a virtual vehicle image is synthesized at a center thereof; performing an object recognition processing on the first image acquired by the first image acquisition unit to detect a warning object; calculating a direction of the warning object from the virtual vehicle image in the bird's-eye view image based on a position of the warning object detected by the detection unit in the first image; and displaying the first image on a first monitor, and displaying the bird's-eye view image and the direction of the warning object in the bird's-eye view image on a second monitor based on a position of the first camera unit in the vehicle image as a reference position.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Figure 1:
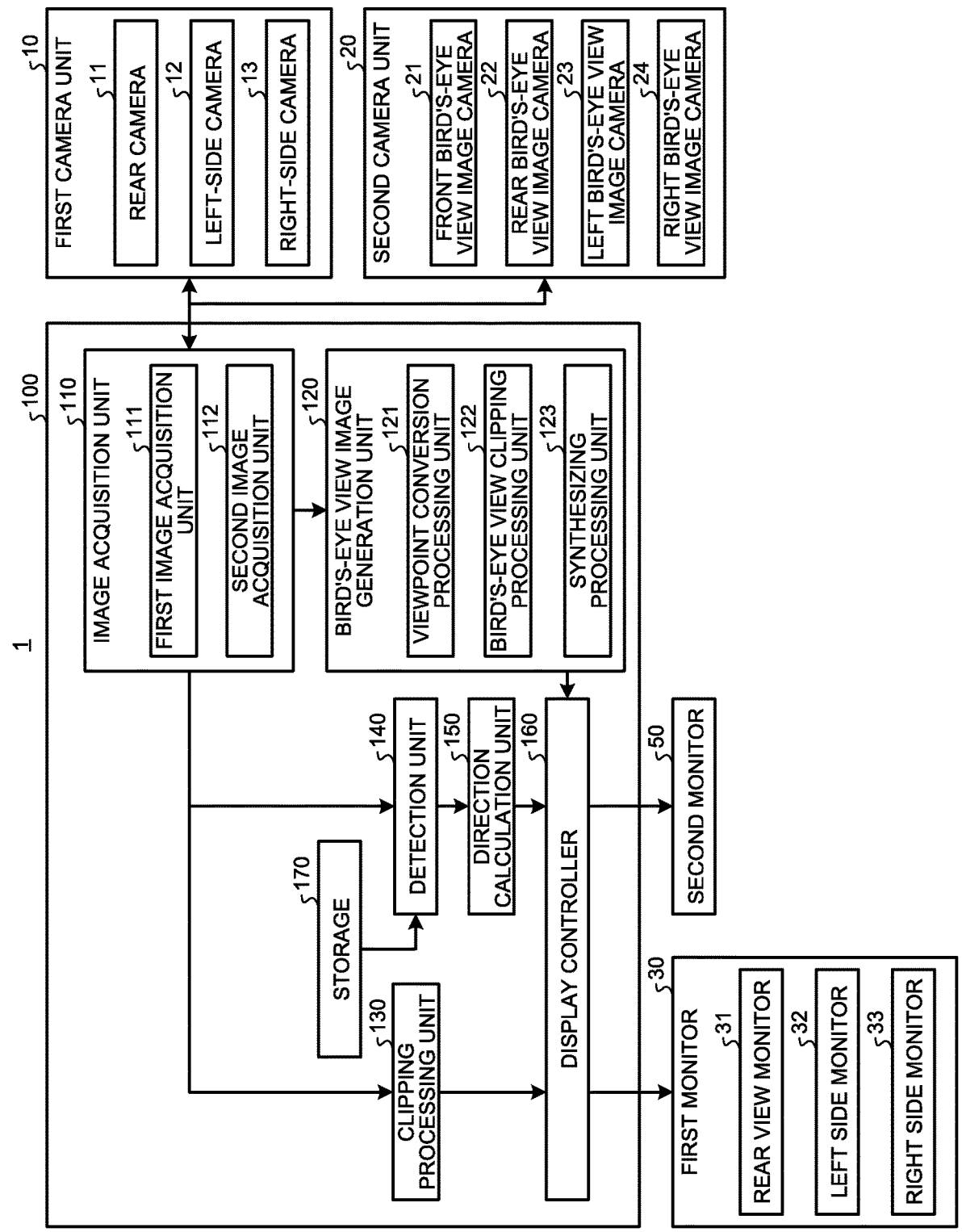
FIG. 1 is a block diagram illustrating a configuration of a vehicle display system according to a first embodiment of the present application.

Hereinafter, embodiments of the present application will be described in detail with reference to the drawings. In the drawings, identical or equivalent sections are denoted by identical reference number, and descriptions thereof will be omitted as appropriate.

First Embodiment

Figure 2:
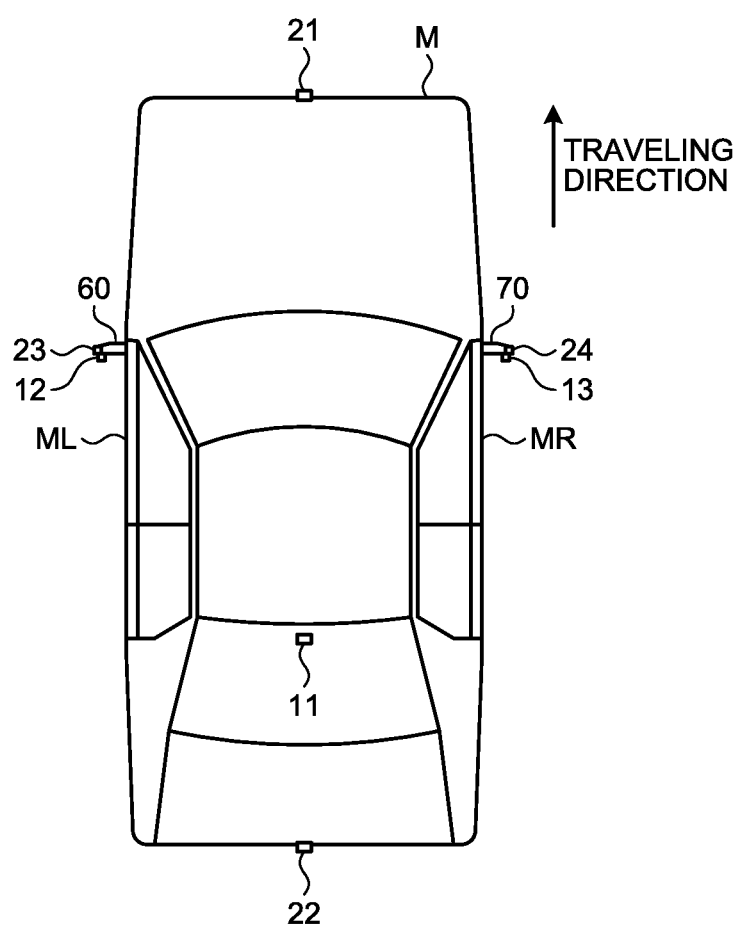
FIG. 2 is a diagram for explaining mounting positions of a first camera unit and a second camera unit.
Figure 3:
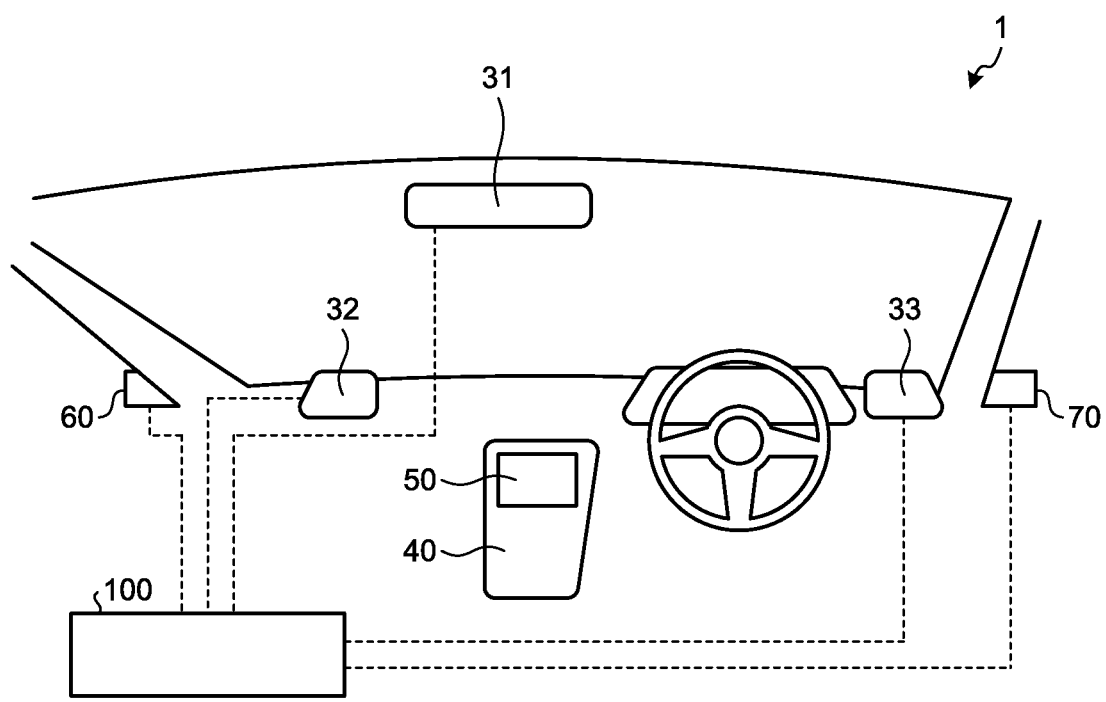
FIG. 3 is a schematic diagram illustrating the configuration of the vehicle display system according to the first embodiment of the present application.

A vehicle display system 1 according to a first embodiment of the present application will be described with reference to FIGS. 1, 2, and 3. FIG. 1 is a block diagram illustrating a configuration of the vehicle display system 1 according to the first embodiment of the present application. FIG. 2 is a diagram for explaining mounting positions of a first camera unit and a second camera unit. FIG. 3 is a schematic diagram illustrating the configuration of the vehicle display system 1 according to the first embodiment of the present application.

As illustrated in FIG. 1, the vehicle display system 1 includes a first camera unit 10, a second camera unit 20, a first monitor 30 as a rearview monitor unit, a second monitor 50 as a monitor for displaying a bird's-eye view image, and a vehicle display control device 100.

The first camera unit 10 includes a rear camera 11, a left-side camera 12, and a right-side camera 13.

The second camera unit 20 includes a front bird's-eye view image camera 21, a rear bird's-eye view image camera 22, a left bird's-eye view image camera 23, and a right bird's-eye view image camera 24.

The first monitor 30 includes a rear view monitor 31, a left-side monitor 32, and a right-side monitor 33. The rear view monitor 31, the left-side monitor 32, and the right-side monitor 33 may be separate monitors or may be configured as a single monitor.

Positions where the rear camera 11, the left-side camera 12, the right-side camera 13, the front bird's-eye view image camera 21, the rear bird's-eye view image camera 22, the left bird's-eye view image camera 23, and the right bird's-eye view image camera 24 are provided will be described with reference to FIG. 2.

The rear camera 11 is disposed facing rearward at a back of a vehicle and captures a rear view of the vehicle. The rear camera 11 has a horizontal view angle of, for example, 90 to 135° and a vertical view angle of, for example, 45 to 90°. The rear camera 11 can capture an image of a wider range than a range displayed on the rear view monitor 31. However, a range where a driver of the vehicle can properly recognize the rear view on the rear view monitor 31 is clipped to be displayed on the rear view monitor 31. The rear camera 11 outputs captured rear image data to an image acquisition unit 110.

The left-side camera 12 is disposed facing rearward on a left camera support unit 60 provided on a left side ML of the vehicle M to capture a rear left-side view of the vehicle. The left camera support unit 60 may be a left-side mirror of the host vehicle M. The left-side camera 12 captures a check range by the left-side monitor 32. The left-side camera 12 has a horizontal view angle of, for example, 15 to 45° and a vertical view angle of, for example, 15 to 45°. The left-side camera 12 can capture an image of a wider range than a range displayed on the left-side monitor 32. However, a range where a driver of the vehicle can properly recognize the rear left-side view on the left-side monitor 32 is clipped to be displayed on the left-side monitor 32. The left-side camera 12 outputs captured rear left-side image data to the image acquisition unit 110.

The right-side camera 13 is disposed facing rearward on a right camera support unit 70 provided on a right side MR of the vehicle M to capture a rear right-side view of the vehicle. The right camera support unit 70 may be a side mirror of the vehicle M. The right-side camera 13 captures a check range by the right-side monitor 33. The right-side camera 13 has a horizontal view angle of, for example, 15 to 45° and a vertical view angle of, for example, 15 to 45°. The right-side camera 13 can capture an image of a wider range than a range displayed on the right-side monitor 33. However, a range where a driver of the vehicle can properly recognize the rear right-side view on the right-side monitor 33 is clipped to be displayed on the right-side monitor 33. The right-side camera 13 outputs captured rear right-side image data to the image acquisition unit 110.

Images captured by the rear camera 11, the left-side camera 12, and the right-side camera 13 are also referred to as first images.

The front bird's-eye view image camera 21 is a bird's-eye view image camera. The front bird's-eye view image camera 21 is disposed at a front of the vehicle M and captures a surrounding around a front of the vehicle M. The front bird's-eye view image camera 21 captures a range of about 180°, for example. The front bird's-eye view image camera 21 outputs captured image data to the image acquisition unit 110.

The rear bird's-eye view image camera 22 is a bird's-eye view image camera. The rear bird's-eye view image camera 22 is disposed at a rear of the vehicle M and captures a surrounding around a rear of the vehicle M. The rear bird's-eye view image camera 22 captures a range of about 180°, for example. The rear bird's-eye view image camera 22 outputs captured image data to the image acquisition unit 110.

The left bird's-eye view image camera 23 is a bird's-eye view image camera. The left bird's-eye view image camera 23 is disposed on the left camera support unit 60 and captures a surrounding around a left side of the vehicle M. The left bird's-eye view image camera 23 captures a range of about 180°, for example. The left bird's-eye view image camera 23 outputs captured image data to the image acquisition unit 110.

The right bird's-eye view image camera 24 is a bird's-eye view image camera. The right bird's-eye view image camera 24 is disposed on the right camera support unit 70 and captures a surrounding around a right side of the vehicle M. The right bird's-eye view image camera 24 captures a range of about 180°, for example. The right bird's-eye view image camera 24 outputs captured image data to the image acquisition unit 110.

The vehicle display system 1 captures all directions of the vehicle M with the front bird's-eye view image camera 21, the rear bird's-eye view image camera 22, the left bird's-eye view image camera 23, and the right bird's-eye view image camera 24.

Outlines of the rear view monitor 31, the left-side monitor 32, the right-side monitor 33, and the second monitor 50 will be described with reference to FIG. 3.

The rear view monitor 31 is an electronic room mirror as an example. When the rear view monitor 31 is used as an electronic room mirror, it does not matter whether a half mirror for checking the rear view by optical reflection is present. The rear view monitor 31 is a display including, for example, a liquid crystal display (LCD) or an organic electro-luminescence (EL) display. The rear view monitor 31 displays a rear view image of a vehicle based on an image signal output from a display controller 160 of the vehicle display control device 100. Therefore, the rear view monitor 31 is disposed at a position easily seen by a driver. In the present embodiment, the rear view monitor 31 is disposed at a central upper part of a windshield in a vehicle width direction. Alternatively, the rear view monitor 31 may be embedded in a dashboard or a headliner. The rear view monitor 31 may be provided with a touch panel.

The rear view monitor 31 is not limited in size and shape. For example, the rear view monitor 31 may have a size and a shape similar to those of a conventional optical room mirror. Alternatively, for example, the rear view monitor 31 may be wider in a vehicle width direction than a conventional optical room mirror. Alternatively, for example, the rear view monitor 31 may be wider in a vertical direction than a conventional optical room mirror.

The left-side monitor 32 is a display including, for example, a liquid crystal display or an organic EL display. The left-side monitor 32 displays a left rear view image of a vehicle based on an image signal output from the display controller 160 of the vehicle display control device 100. The left-side monitor 32 is disposed at a position easily seen by a driver. In the present embodiment, the left-side monitor 32 is disposed on a left side of a dashboard in the vehicle width direction. The left-side monitor 32 may be provided with a touch panel. Further, the left-side monitor 32 may be integrally provided on a left side of the rear view monitor 31.

The right-side monitor 33 is a display including, for example, a liquid crystal display or an organic EL display. The right-side monitor 33 displays a right rear view image of a vehicle based on an image signal output from the display controller 160 of the vehicle display control device 100. The right-side monitor 33 is disposed at a position easily seen by a driver. In the present embodiment, the right-side monitor 33 is disposed on a right side of the dashboard in the vehicle width direction. The right-side monitor 33 may be provided with a touch panel. Further, the right-side monitor 33 may be integrally provided on the right side of the rear view monitor 31.

The second monitor 50 is a display including, for example, a liquid crystal display or an organic EL display. The second monitor 50 displays a bird's-eye view image around the vehicle M based on an image signal output from the display controller 160 of the vehicle display control device 100. The second monitor 50 is disposed at a position easily seen by a driver. In the present embodiment, the second monitor 50 is disposed on a center console 40, for example.

Descriptions will be referred to FIG. 1 again. The vehicle display control device 100 includes the image acquisition unit 110, a bird's-eye view image generation unit 120, a clipping processing unit 130, a detection unit 140, a direction calculation unit 150, the display controller 160, and a storage 170. The vehicle display control device 100 can be realized by an electronic circuit including a central processing unit (CPU).

The image acquisition unit 110 includes a first image acquisition unit 111 and a second image acquisition unit 112.

The first image acquisition unit 111 acquires images captured by the rear camera 11, the left-side camera 12, and the right-side camera 13 as first images. The first image acquisition unit 111 outputs the acquired first images to the clipping processing unit 130 and the detection unit 140.

The second image acquisition unit 112 acquires images captured by the front bird's-eye view image camera 21, the rear bird's-eye view image camera 22, the left bird's-eye view image camera 23, and the right bird's-eye view image camera 24 as second images. The second image acquisition unit 112 outputs the acquired second images to the bird's-eye view image generation unit 120.

The bird's-eye view image generation unit 120 performs a viewpoint conversion processing on the second images received from the second image acquisition unit 112, and a synthesizing processing on the converted second images which correspond to surrounding images, and generates a bird's-eye view image in a display range where surroundings of the vehicle M are displayed. The bird's-eye view image generation unit 120 outputs the generated bird's-eye view image to the display controller 160. The bird's-eye view image generation unit 120 includes a viewpoint conversion processing unit 121, a bird's-eye view clipping processing unit 122, and a synthesizing processing unit 123.

The viewpoint conversion processing unit 121 generates images obtained by performing a viewpoint conversion processing on the second images so that the vehicle M is looked down from above. A method of the viewpoint conversion processing may be any known method and is not limited. The viewpoint conversion processing unit 121 outputs the converted surrounding images to the bird's-eye view clipping processing unit 122.

The bird's-eye view clipping processing unit 122 performs a clipping processing of clipping an image with a predetermined range in the converted surrounding images. A range to be clipped is registered and stored in advance. The bird's-eye view clipping processing unit 122 outputs the clipped image data to the synthesizing processing unit 123.

The synthesizing processing unit 123 performs a synthesizing processing of synthesizing the clipped image data. The synthesizing processing unit 123 generates a bird's-eye view image with a vehicle icon as the vehicle image displayed on the synthesized image data.

The clipping processing unit 130 clips at least a part of the first images acquired by the first image acquisition unit 111. Specifically, the clipping processing unit 130 clips images to be displayed on the rear view monitor 31, the left-side monitor 32, and the right-side monitor 33 from the first images. The clipping processing unit 130 may clips the first images in a horizontal direction or clips in the vertical direction. The clipping processing unit 130 outputs the clipped images to the display controller 160.

Figure 4:
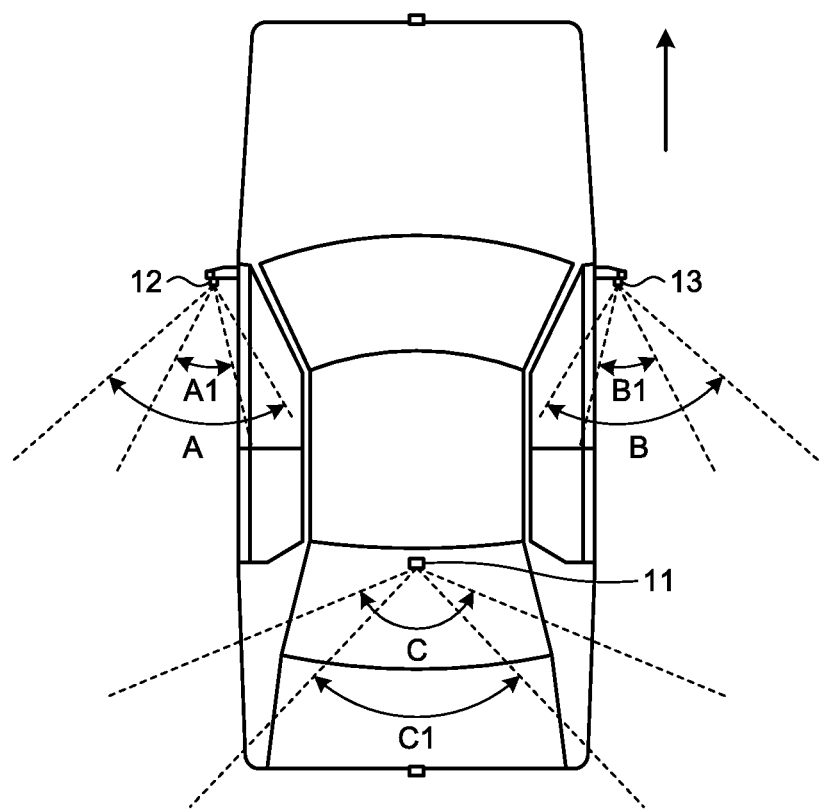
FIG. 4 is a diagram for explaining an imaging range of a first camera unit and a display range of a first monitor.

With reference to FIG. 4, a range in which the clipping processing unit 130 clips images will be described. FIG. 4 is a diagram for explaining imaging ranges of the first camera unit 10 and display ranges of the first monitor 30.

A range A is an imaging range of the left-side camera 12. The clipping processing unit 130 clips, in the range A, an image in a range A1 as an image to be displayed on the left-side monitor 32. The clipping processing unit 130 outputs the image in the range A1 to the display controller 160 as rear left-side display image data.

A range B is an imaging range of the right-side camera 13. The clipping processing unit 130 clips, in the range B, an image in a range B1 as an image to be displayed on the right-side monitor 33. The clipping processing unit 130 outputs the image in the range B1 to the display controller 160 as rear right-side display image data.

A range C is an imaging range of the rear camera 11. The clipping processing unit 130 clips, in the range C, an image in a range C1 as an image to be displayed on the rear view monitor 31. The clipping processing unit 130 outputs the image in the range C1 to the display controller 160 as rear display image data.

The detection unit 140 performs an object recognition processing on the first images acquired by the first image acquisition unit 111. A warning object is an obstacle such as a person or a vehicle and is an object likely to interfere with driving. The detection unit 140 detects warning objects on both sides of the vehicle M, for example, when the vehicle M is moved backward or parked in parallel. For example, when the vehicle M makes a right or a left turn, the detection unit 140 may detect warning objects only in a turning direction before starting turning, and detect warning objects on both sides of the vehicle M when starting turning. The detection unit 140 may detect only a specific warning object such as only a car or only a pedestrian. For example, in a case of left-hand traffic, the detection unit 140 may detect a vehicle and a pedestrian on a left side and detect only a vehicle on a right side. In other words, the detection unit 140 can change detection conditions according to a driving situation of the vehicle M. It is only necessary that a well-known technique be used for the object recognition processing for detecting a warning object by the detection unit 140. When detecting a warning object, the detection unit 140 outputs a signal indicating that a warning object has been detected to the direction calculation unit 150.

Figure 5:
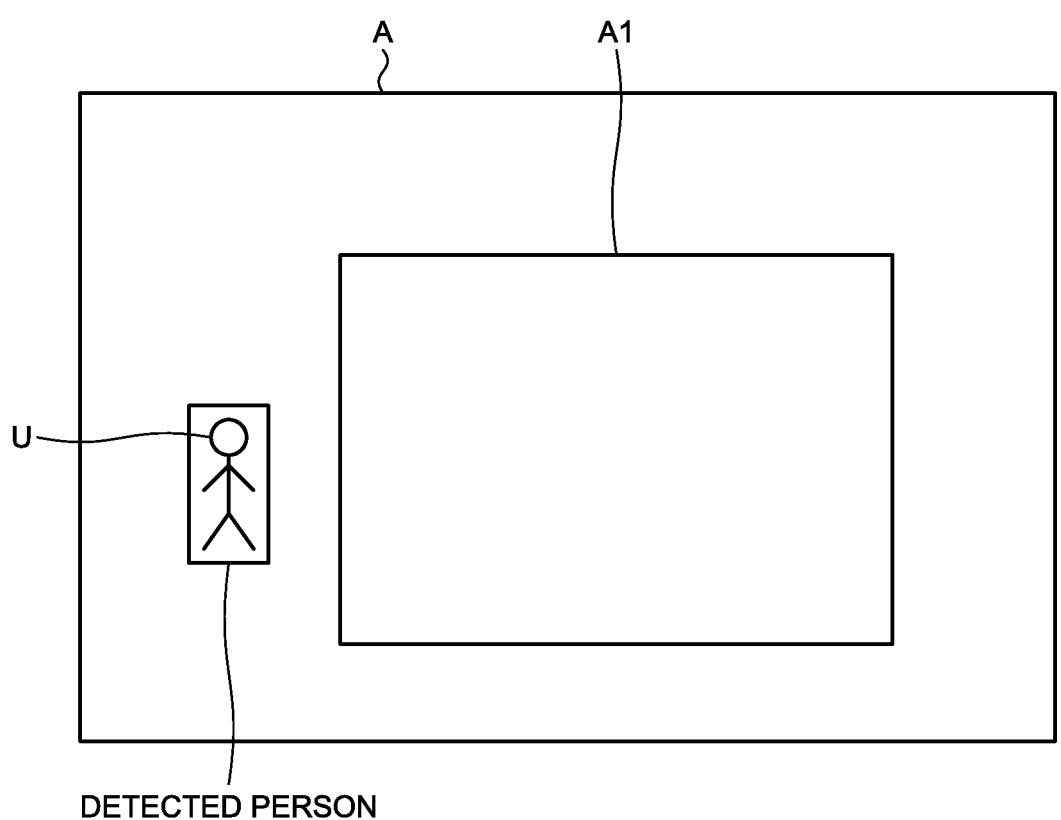
FIG. 5 is a diagram for explaining a range in which a warning object is detected.

A range in which a warning object is detected will be described with reference to FIG. 5. FIG. 5 is a diagram for explaining a range in which a warning object is detected.

FIG. 5 illustrates the range A as an imaging range of the left-side camera 12 and the range A1 as a display range of the left-side monitor 32. As illustrated in FIG. 5, the detection unit 140 detects a warning object based on the first images, and thus can detect a person U as a warning object even outside the display range of the left-side monitor 32.

The direction calculation unit 150 calculates, based on a position of a warning object detected by the detection unit 140 in the first images, a direction of the warning object from the vehicle in the bird's-eye view image. Specifically, the direction calculation unit 150 calculates the direction of the warning object from the vehicle in the bird's-eye view image by calculating coordinates in the first images. The direction calculation unit 150 calculates the direction of the warning object from the host vehicle M based on, for example, the range A1 which is the display range of the left-side monitor 32 as a base point. The direction calculation unit 150 outputs a signal indicating the direction of the warning object from the vehicle M to the display controller 160.

The display controller 160 displays the rear display image data on the rear view monitor 31. The display controller 160 displays the rear left-side display image data on the left-side monitor 32. The display controller 160 displays the rear right-side display image data on the right-side monitor 33.

The display controller 160 displays the bird's-eye view image generated by the bird's-eye view image generation unit 120 on the second monitor 50. For example, the display controller 160 displays the bird's-eye view image on the second monitor 50 when moving backward or turning left or right. The display controller 160 displays the bird's-eye view image on the second monitor 50 when decelerating to a predetermined speed or less at an intersection or when waiting for a traffic light, for example. The display controller 160 detects that a traveling place is an intersection based on, for example, position information acquired from a car navigation device. The display controller 160 displays an icon of a warning object in the bird's-eye view image and displays a direction from the vehicle to the warning object.

The display controller 160 detects that the vehicle M is moving backward by receiving a signal indicating that a shift position is a reverse position, for example. The display controller 160 ends an operation of displaying a bird's-eye view image on the second monitor 50 when receiving a signal indicating that the shift position is released from the reverse position, for example.

The display controller 160 detects that the vehicle M makes a right/left turn by, for example, detecting that the car navigation device instructs a right/left turn.

For example, the display controller 160 may display the bird's-eye view image on the second monitor 50 and may display a warning display indicating that a warning object has been detected on the left-side monitor 32 or the right-side monitor 33. Thereby, the display controller 160 makes a driver to view the second monitor 50.

The display controller 160 may switch a display range of a rear left-side image or a rear right-side image to be displayed on the left-side monitor 32 or the right-side monitor 33 when a warning object is detected, for example. Specifically, the display controller 160 may widen a display range to be displayed on the left-side monitor 32 or the right-side monitor 33. The display controller 160 widens the display range to be displayed on the left-side monitor 32 or the right-side monitor 33 by an operation of a touch panel provided on the left-side monitor 32 or the right-side monitor 33 or an operation using another interface, for example. The display controller 160 is provided with, for example, a microphone in the vehicle display control device 100 and widens the display range to be displayed on the left-side monitor 32 or the right-side monitor 33 when instructed by a driver through the microphone.

Figure 6:
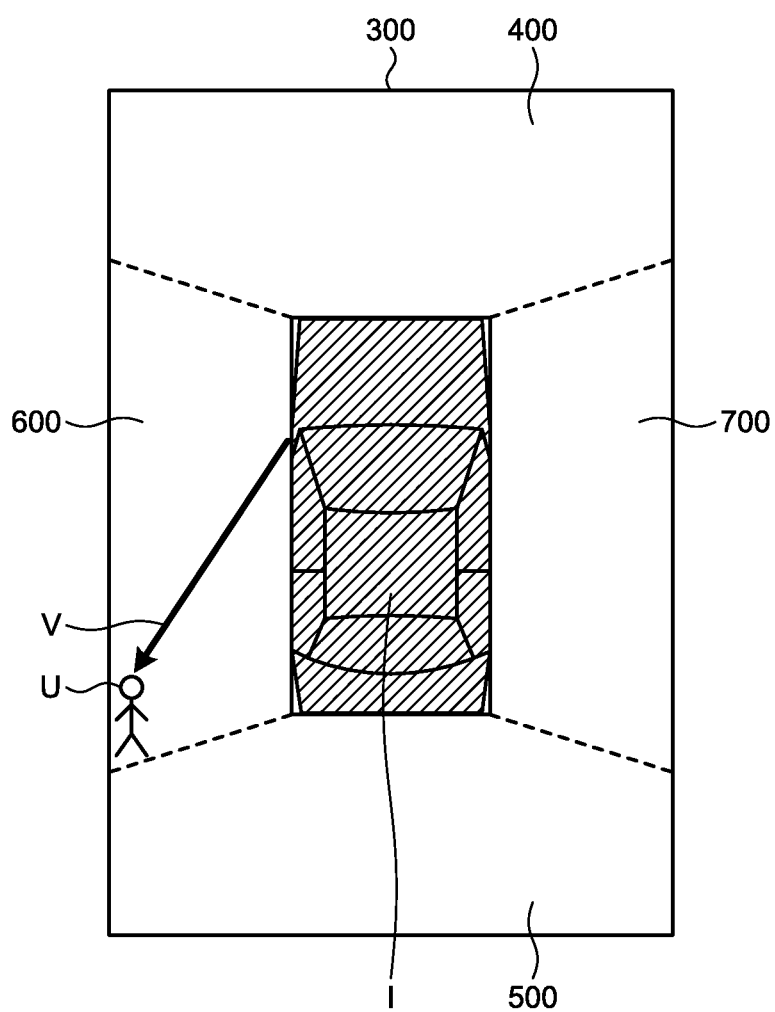
FIG. 6 is a diagram illustrating an example of an image displayed on a second monitor of a vehicle display control device according to the first embodiment of the present application.

An example of a bird's-eye view image displayed on the second monitor 50 by the display controller 160 will be described with reference to FIG. 6. FIG. 6 is a diagram illustrating an example of the bird's-eye view image displayed on the second monitor 50 by the display controller 160.

A bird's-eye view image 300 illustrated in FIG. 6 includes a front image 400 captured by the front bird's-eye view image camera 21, a rear image 500 captured by the rear bird's-eye view image camera 22, a left image 600 captured by the left bird's-eye view image camera 23, and a right-side image 700 captured by the right bird's-eye view image camera 24. In a center of the bird's-eye view image 300, an icon I of the vehicle M is illustrated.

The display controller 160 displays a person U as a warning object and a direction V on the bird's-eye view image 300, thereby notifying a driver that a warning object has been detected. FIG. 6 illustrates a case where the person U is captured by the left-side camera 12. In this case, the display controller 160 displays the direction of the warning object based on a position of the left-side camera 12 as a reference position. The display controller 160 may change an icon to be displayed according to a type of the warning object such as a person, a vehicle, or a bicycle. The display controller 160 may reduce and display the captured warning object image instead of the icon of the warning object. It is only necessary that the display controller 160 display at least the direction V to the warning object, and the icon of the person U may not be displayed. For example, the display controller 160 may display the direction V thickened or may display a color changed according to a level of danger. The level of danger may be set based on, for example, a position of the warning object detected by the detection unit 140 in the first images.

When the warning object is captured by the rear camera 11, the display controller 160 displays the direction of the warning object based on a position of the rear camera 11 as a reference position. When the warning object is detected by the right-side camera 13, the display controller 160 displays the direction of the warning object based on a position of the right-side camera 13 as a reference position.

Descriptions will be referred to FIG. 1 again. The storage 170 stores programs for the vehicle display control device 100 to control each unit of the vehicle display control device 100. The storage 170 stores, for example, dictionary data for the detection unit 140 to detect a warning object. The storage 170 is, for example, a semiconductor memory device such as a random access memory (RAM), a read only memory (ROM), and a flash memory, or a storage device such as a hard disk, a solid state drive, and an optical disk.

Figure 7:
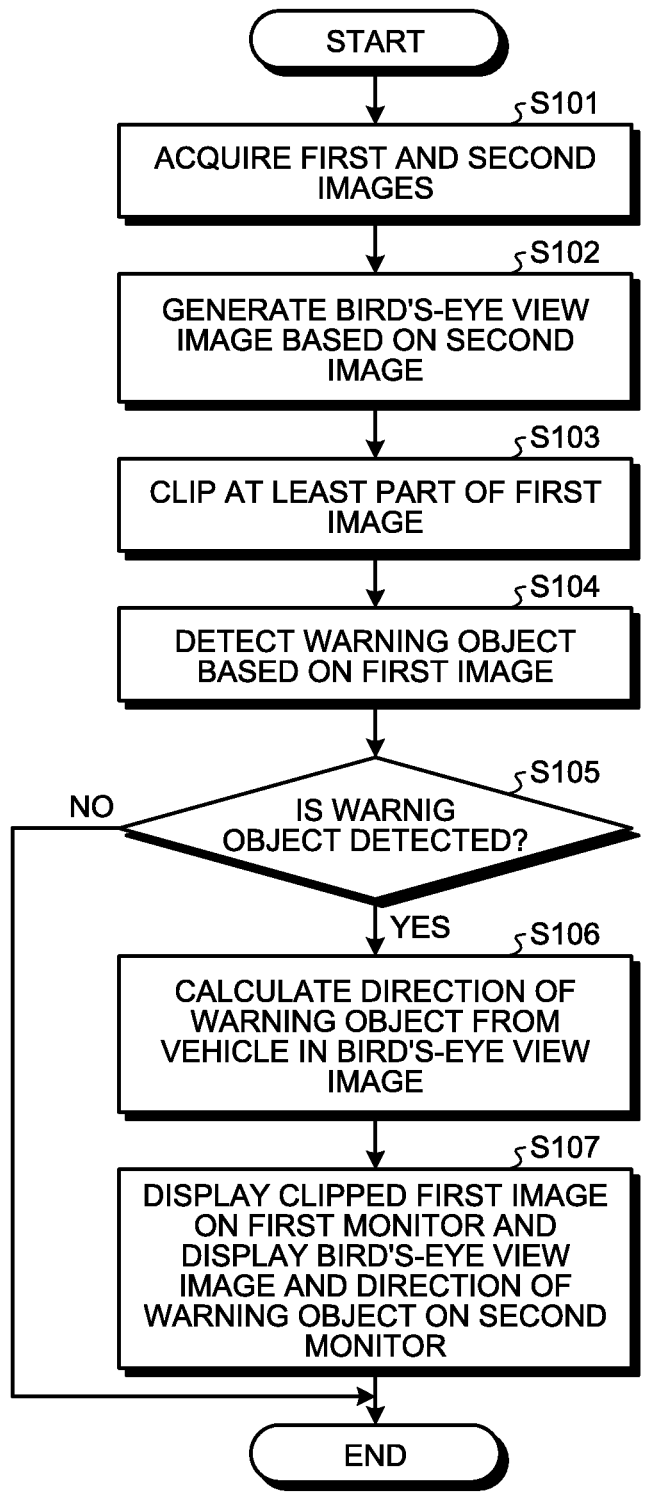
FIG. 7 is a flowchart illustrating an example of an process flow of the vehicle display control device according to the first embodiment of the present application.

Processes of the vehicle display control device 100 will be described with reference to FIG. 7. FIG. 7 is a flowchart illustrating a process flow of the vehicle display control device 100.

First, the vehicle display control device 100 acquires the first images from the first camera unit 10 and the second images from the second camera unit 20 (step S101). Then, the vehicle display control device 100 proceeds to step S102.

The vehicle display control device 100 generates the bird's-eye view image in which a virtual vehicle image is synthesized at a center thereof based on the second images (step S102). Then, the vehicle display control device 100 proceeds to step S103.

The vehicle display control device 100 clips at least a part of the first images (step S103). Then, the vehicle display control device 100 proceeds to step S104.

The vehicle display control device 100 detects a warning object based on the first images (step S104). Then, the vehicle display control device 100 proceeds to step S105.

When a warning object is detected ("Yes" in step S105), the vehicle display control device 100 proceeds to step S106 and calculates a direction of the warning object from the vehicle in the bird's-eye view image (step S106). Then, the vehicle display control device 100 proceeds to step S107. On the other hand, when a warning object is not detected ("No" in step S105), the vehicle display control device 100 ends the processes of FIG. 7.

The vehicle display control device 100 always displays the first images clipped in step S103 on the first monitor 30. Further, the vehicle display control device 100 displays the bird's-eye view image and the direction of the warning object on the second monitor 50 based on the position of the first camera unit in the vehicle image as a reference position (step S107). Then, the vehicle display control device 100 ends the processes of FIG. 7.

As described above, the present embodiment detects the warning object behind the vehicle and generates the bird's-eye view image indicating the direction of the detected warning object. As a result, the driver can easily grasp a positional relationship between the vehicle and the warning object around the vehicle when moving backward into a garage, for example, so that the driver can drive safely.

Second Embodiment

Figure 8:
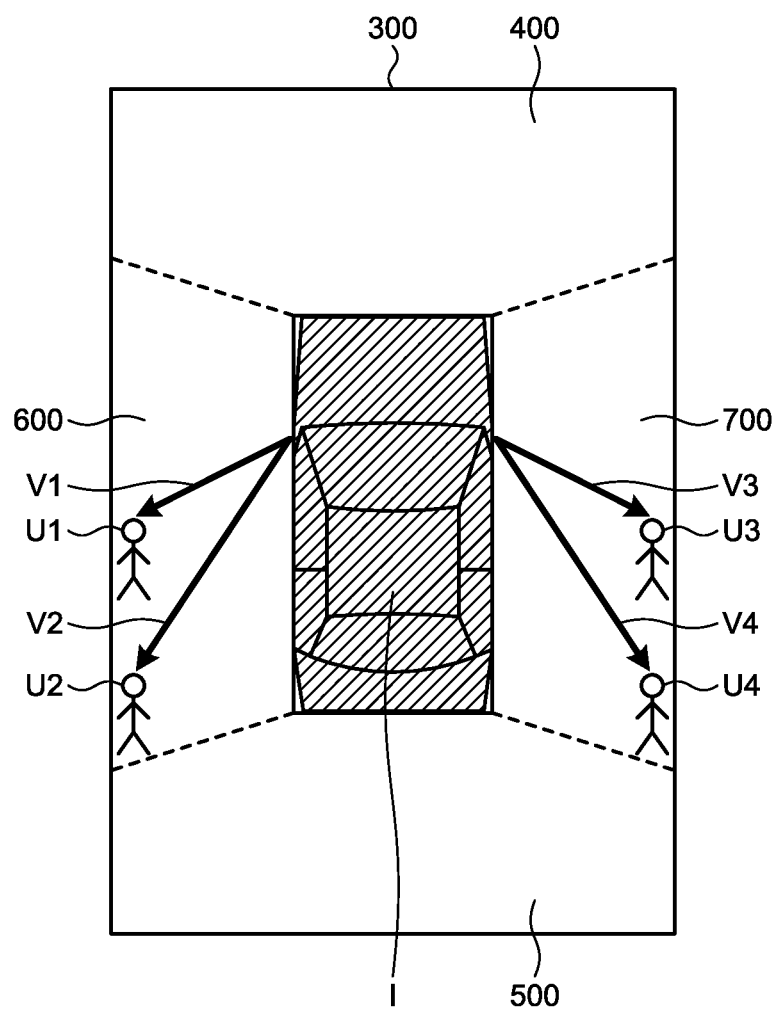
FIG. 8 is a diagram illustrating an example of an image displayed on a second bird's-eye view image monitor of a vehicle display control device according to a second embodiment of the present application.

Next, processes of the vehicle display control device 100 according to a second embodiment of the present application will be described with reference to FIG. 8. FIG. 8 is a diagram illustrating an example of an image displayed on the second monitor 50 of the vehicle display control device 100 according to the second embodiment of the present application. A configuration of the vehicle display control device 100 according to the second embodiment of the present application is identical to one of the vehicle display control device 100 according to the first embodiment of the present application.

The bird's-eye view image 300 illustrated in FIG. 8 includes a first person U1, a second person U2, a third person U3, and a fourth person U4 as a warning object. In brief, the detection unit 140 of the vehicle display control device 100 according to the second embodiment detects a plurality of warning objects. In this case, the direction calculation unit 150 calculates a direction V1 of the first person U1. The direction calculation unit 150 calculates a direction V2 of the second person U2. The direction calculation unit 150 calculates a direction V3 of the third person U3. The direction calculation unit 150 calculates a direction V4 of the fourth person U4.

The display controller 160 displays the direction V1 of the first person U1, the direction V2 of the second person U2, the direction V3 of the third person U3, and the direction V4 of the fourth person U4 on the bird's-eye view image 300, thereby notifying the driver that warning objects have been detected. The display controller 160 may change and display a display mode of each of the direction V1 of the first person U1, the direction V2 of the second person U2, the direction V3 of the third person U3, and the direction V4 of the fourth person U4. For example, the display controller 160 may display the directions thickened or may display colors changed according to the level of danger in terms of, for example, a distance or a moving direction. The display controller 160 may display, when at least one of the warning objects exceeds a predetermined danger level, only the direction thereof.

Figure 9:
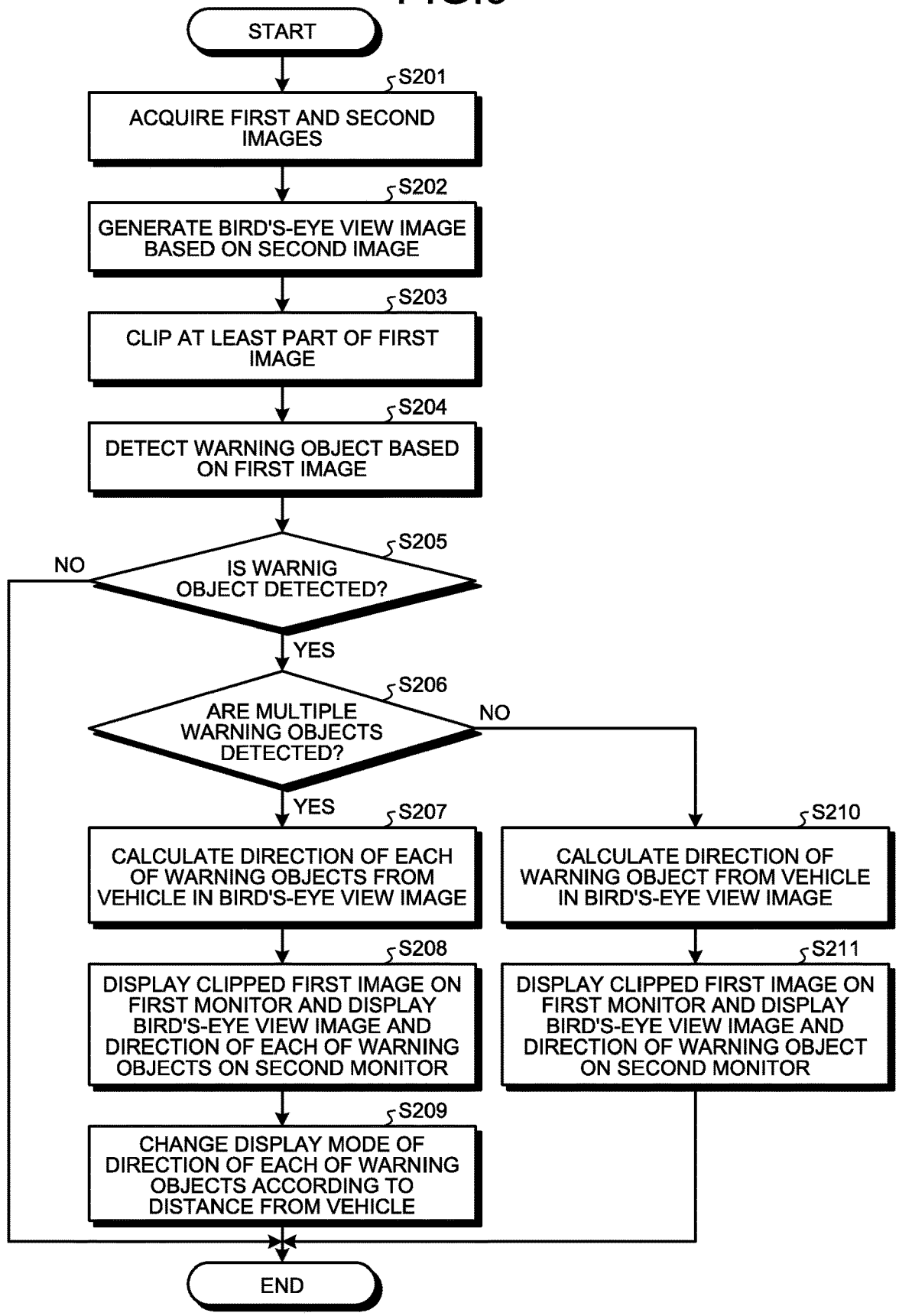
FIG. 9 is a flowchart illustrating an example of an process flow of the vehicle display control device according to the second embodiment of the present application.

Processes of the vehicle display control device 100 according to the second embodiment will be described with reference to FIG. 9. FIG. 9 is a flowchart illustrating an example of a process flow of the vehicle display control device 100 according to the second embodiment.

Steps S201 to S204 are identical to steps S101 to S104, and thus descriptions thereof will be omitted.

When a warning object is detected ("Yes" in step S205), the vehicle display control device 100 proceeds to step S206 and determines whether multiple warning objects are detected (step S206). On the other hand, when no warning objects are detected ("No" in step S205), the vehicle display control device 100 ends the processes of FIG. 9.

When multiple warning objects are detected ("Yes" in step S206), the vehicle display control device 100 proceeds to step S207 and calculates a direction of each of the warning objects from the vehicle in the bird's-eye view image (step S207). Then, the vehicle display control device 100 proceeds to step S208.

The vehicle display control device 100 displays the first image clipped in step S203 on the first monitor 30 and displays the bird's-eye view image and the direction of each of the warning objects on the second monitor 50 (step S208). Then, the vehicle display control device 100 proceeds to step S209.

The vehicle display control device 100 changes the display mode of the direction of each of the warning objects according to a distance from the vehicle (step S209). Then, the vehicle display control device 100 ends the processes of FIG. 9. The processing of step S209 may be omitted.

On the other hand, when multiple warning objects are not detected in step S206 ("No" in step S206), the vehicle display control device 100 proceeds to step S210 and calculates a direction from the vehicle to the warning object in the bird's-eye view image (step S210). Then, the vehicle display control device 100 proceeds to step S211.

The vehicle display control device 100 displays the first image clipped in step S203 on the first monitor 30 and displays the bird's-eye view image and the direction of the warning object on the second monitor 50 based on the position of the first camera unit in the vehicle image as a reference position (step S211). Then, the vehicle display control device 100 ends the processes of FIG. 9.

As described above, the present embodiment detects multiple warning objects not displayed on the first monitor 30 and generates the bird's-eye view image indicating the directions of the detected warning objects. As a result, the driver can easily grasp a positional relationship between the vehicle and the warning objects around the vehicle when moving backward into a garage, so that the driver can drive safely.

Moreover, the present embodiment can change the display mode of the direction according to the danger level of each of the warning objects. As a result, the driver can grasp the level of danger of each of the warning objects and drive more safely.

Third Embodiment

Figure 10:
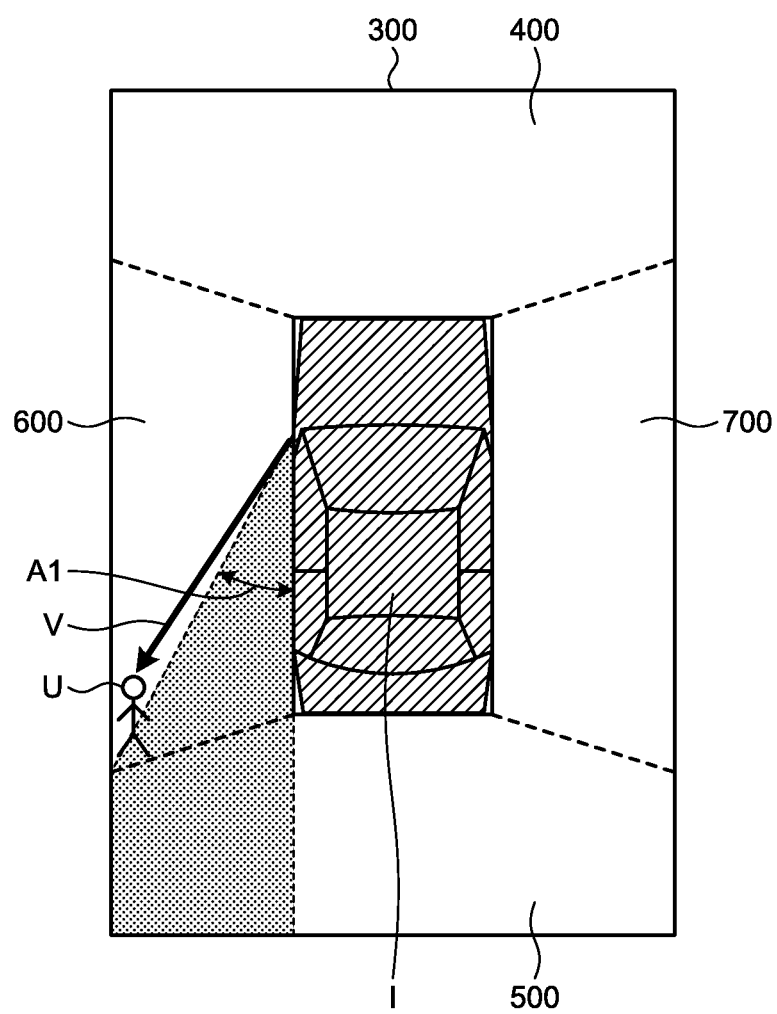
FIG. 10 is a diagram illustrating an example of an image displayed on a second bird's-eye view image monitor of a vehicle display control device according to a third embodiment of the present application.

Next, processes of the vehicle display control device 100 according to a third embodiment of the present application will be described with reference to FIG. 10. FIG. 10 is a diagram illustrating an example of an image displayed on the second monitor 50 of the vehicle display control device 100 according to the third embodiment of the present application. The configuration of the vehicle display control device 100 according to the third embodiment of the present application is identical to that of the vehicle display control device 100 according to the first embodiment of the present application.

The bird's-eye view image 300 illustrated in FIG. 10 illustrates a range A1 as a range of a left-side image displayed on the left-side monitor 32. In other words, in the present embodiment, the display controller 160 displays the direction of the person U calculated by the direction calculation unit 150 and the display range of the left-side monitor 32 corresponding to the direction of the person U.

In the present embodiment, the detection unit 140 may perform an object recognition processing on the first images, acquired by the first image acquisition unit 111, outside the display range of the left-side image displayed on the left-side monitor 32, and detect a warning object. The detection unit 140 may detect, even when at least a part of a warning object is outside the display range of the left-side image displayed on the left-side monitor 32, the warning object.

Figure 11:
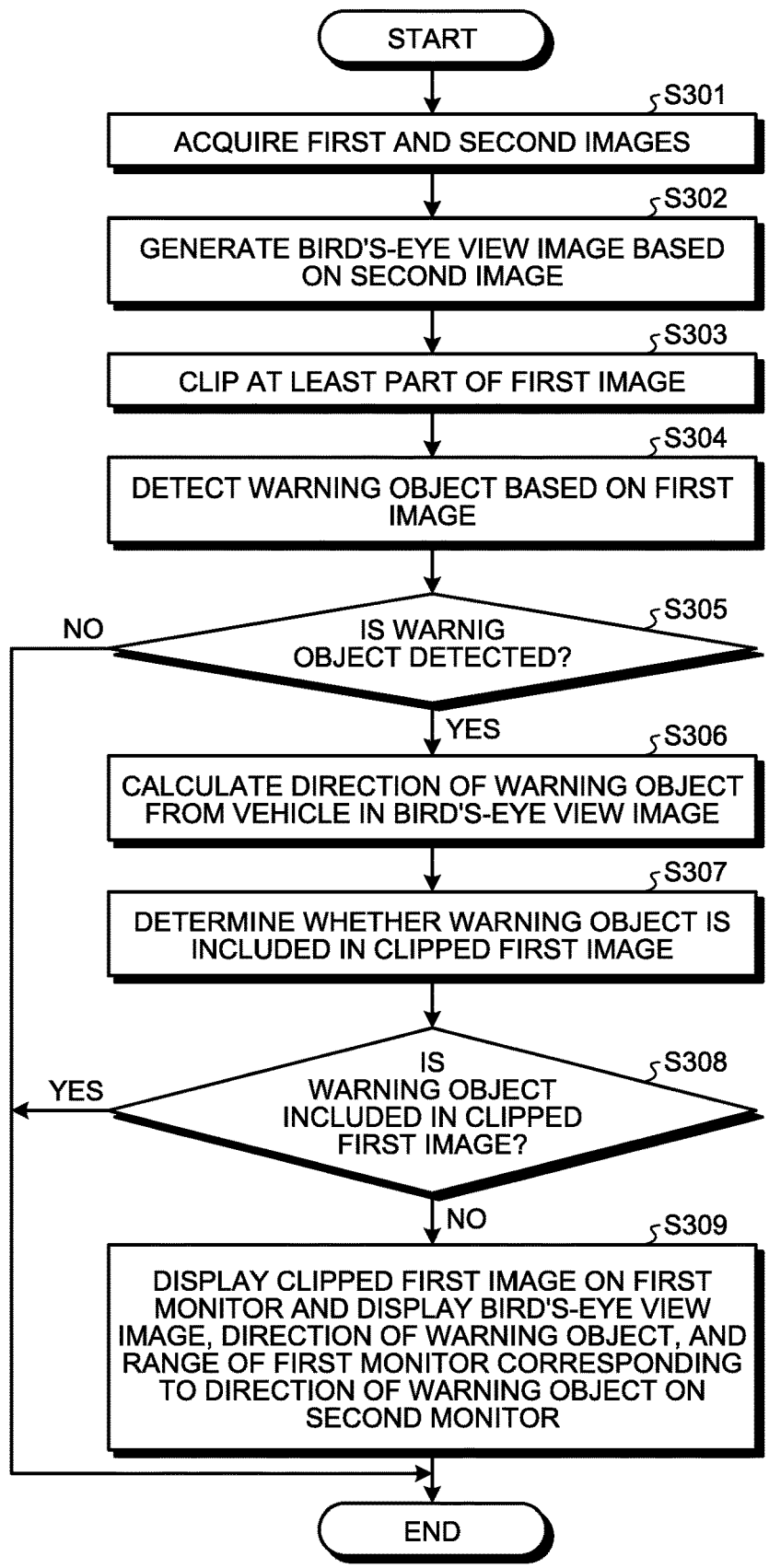
FIG. 11 is a flowchart illustrating an example of a process flow of the vehicle display control device according to the third embodiment of the present application.

Processes of the vehicle display control device 100 according to the third embodiment will be described with reference to FIG. 11. FIG. 11 is a flowchart illustrating an example of a process flow of the vehicle display control device 100 according to the third embodiment.

Steps S301 to S306 are identical to steps S101 to S106, and thus descriptions thereof will be omitted.

The vehicle display control device 100 determines whether the warning object is included in the clipped first image clipped in step S303 (step S307). Then, the vehicle display control device 100 proceeds to step S308.

When the warning object is included in the clipped image ("Yes" in step S308), the vehicle display control device 100 ends the processes of FIG. 11.

On the other hand, when the warning object is not included in the clipped first image ("No" in step S308), the vehicle display control device 100 displays the clipped first image clipped in step S303 on the first monitor 30, displays the bird's-eye view image, the direction of the warning object based on the position of the first camera unit in the vehicle image as a reference position, and the display range of the first monitor 30 corresponding to the direction of the warning object, that is, the display range of the left-side monitor 32 on the second monitor 50 (step S309). Then, the vehicle display control device 100 ends the processes of FIG. 11.

As described above, the present embodiment detects the warning object not displayed on the first monitor 30 and generate the bird's-eye view image indicating the direction of the detected warning object. As a result, a driver can easily grasp a positional relationship between the vehicle and the warning object around the vehicle when moving backward into a garage, for example, so that the driver can drive safely.

According to the present application, it is possible to appropriately grasp a positional relationship between a warning object and a vehicle.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display control device comprising:
   a first image acquisition unit configured to acquire a first image captured by a first camera unit configured to capture a rear view, a rear left-side view, and a rear right-side view of a vehicle;
   a second image acquisition unit configured to acquire a second image captured by a second camera unit configured to capture images of surroundings of the vehicle; a bird's-eye view image generation unit configured to generate, based on the second image acquired by the second image acquisition unit, a bird's-eye view image in which a virtual vehicle image is synthesized at a center thereof;
a detection unit configured to perform an object recognition processing on the first image acquired by the first image acquisition unit to detect a warning object;
a direction calculation unit configured to calculate a direction of the warning object from the virtual vehicle image in the bird's-eye view image based on a position of the warning object detected by the detection unit in the first image; and
a display controller configured to display the first image on a first monitor, and display the bird's-eye view image generated by the bird's-eye view image generation unit and the direction of the warning object calculated by the direction calculation unit in the bird's-eye view image on a second monitor based on a position of the first camera unit in the virtual vehicle image as a reference position, wherein
the vehicle display control device further comprising a clipping processing unit configured to clip at least a part of the first image acquired by the first image acquisition unit, and
the display controller is further configured to display the first image clipped by the clipping processing unit on the first monitor, and display, when the warning object is included in a range not displayed on the first monitor, the direction of the warning object calculated by the direction calculation unit on the second monitor.

2. The vehicle display control device according to claim 1, wherein the display controller is further configured to display, on the second monitor, a display range of the first monitor corresponding to the warning object in addition to the direction of the warning object calculated by the direction calculation unit.

3. The vehicle display control device according to claim 1, wherein the display controller is further configured to display a warning display on the first monitor when the warning object is detected.

4. The vehicle display control device according claim 1, wherein the display controller is further configured to change, when a plurality of the warning objects is detected, a display mode of the direction of each of the plurality of the warning objects according to a distance from the vehicle on the second monitor.

5. A vehicle display system comprising:
the vehicle display control device according to claim 1;
the first camera unit;
the second camera unit;
the second monitor; and
the first monitor.

6. A vehicle display control method comprising:
acquiring a first image captured by a first camera unit configured to capture a rear view, a rear left-side view, and a rear right-side view of a vehicle;
acquiring a second image captured by a second camera unit configured to capture images of surroundings of the vehicle;
generating, based on the second image acquired by the second image acquisition unit, a bird's-eye view image in which a virtual vehicle image is synthesized at a center thereof;
performing an object recognition processing on the first image acquired by the first image acquisition unit to detect a warning object;
calculating a direction of the warning object from the virtual vehicle image in the bird's-eye view image based on a position of the warning object detected by the detection unit in the first image; and
displaying the first image on a first monitor, and displaying the bird's-eye view image and the direction of the warning object in the bird's-eye view image on a second monitor based on a position of the first camera unit in the virtual vehicle image as a reference position, wherein
the vehicle display control method further comprising:
clipping at least a part of the acquired first image;
displaying the clipped first image on the first monitor; and
displaying, when the warning object is included in a range not displayed on the first monitor, the calculated direction of the warning object on the second monitor.

7. A non-transitory storage medium that stores a program that causes a computer of a vehicle display control device to execute:
acquiring a first image captured by a first camera unit configured to capture a rear view, a rear left-side view, and a rear right-side view of a vehicle;
acquiring a second image captured by a second camera unit configured to capture images of surroundings of the vehicle;
generating, based on the second image acquired by the second image acquisition unit, a bird's-eye view image in which a virtual vehicle image is synthesized at a center thereof;
performing an object recognition processing on the first image acquired by the first image acquisition unit to detect a warning object;
calculating a direction of the warning object from the virtual vehicle image in the bird's-eye view image based on a position of the warning object detected by the detection unit in the first image; and
displaying the first image on a first monitor, and displaying the bird's-eye view image and the direction of the warning object in the bird's-eye view image on a second monitor based on a position of the first camera unit in the virtual vehicle image as a reference position, wherein
the program further causes the computer to execute:
clipping at least a part of the acquired first image;
displaying the clipped first image on the first monitor; and
displaying, when the warning object is included in a range not displayed on the first monitor, the calculated direction of the warning object on the second monitor.

* * * * *